(12) United States Patent
Zhang et al.

(10) Patent No.: US 8,576,876 B2
(45) Date of Patent: Nov. 5, 2013

(54) METHOD AND SYSTEM FOR DETERMINING AND OPTIMIZING THROUGHPUT OF SHORT RANGE WIRELESS NETWORK

(75) Inventors: Yijin Zhang, Shenzhen (CN); Pingping Xu, Shenzhen (CN); Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/482,509

(22) Filed: May 29, 2012

(65) Prior Publication Data

US 2012/0230318 A1    Sep. 13, 2012

Related U.S. Application Data

(60) Division of application No. 12/412,670, filed on Mar. 27, 2009, now Pat. No. 8,208,487, which is a continuation of application No. PCT/CN2007/070861, filed on Oct. 9, 2007.

(30) Foreign Application Priority Data

Oct. 9, 2006 (CN) .......................... 2006 1 0140222

(51) Int. Cl.
*H04J 3/00* (2006.01)
(52) U.S. Cl.
USPC ........................................................ 370/464
(58) Field of Classification Search
USPC ................................................. 370/464–546
See application file for complete search history.

(56) References Cited

U.S. PATENT DOCUMENTS

| | | | |
|---|---|---|---|
| 6,064,678 A | 5/2000 | Sindhushayana et al. | |
| 6,868,478 B2 * | 3/2005 | Kishi et al. | 711/113 |
| 8,208,487 B2 * | 6/2012 | Zhang et al. | 370/464 |
| 2002/0071388 A1 | 6/2002 | Bergsson et al. | |
| 2002/0087282 A1 * | 7/2002 | Millard | 702/108 |

(Continued)

FOREIGN PATENT DOCUMENTS

| | | |
|---|---|---|
| CN | 1301439 A | 6/2001 |
| CN | 1585404 A | 2/2005 |

OTHER PUBLICATIONS

1st Office Action in related U.S. Appl. No. 12/412,670 (Sep. 15, 2011).

(Continued)

*Primary Examiner* — Fan Ng
(74) *Attorney, Agent, or Firm* — Leydig, Voit & Mayer, Ltd.

(57) ABSTRACT

Methods and systems for determining and optimizing a throughput of a short range wireless network are provided. The method mainly includes acquiring respective time parameters in a contention access period based on information transmission characteristics of the short range wireless network; and computing and optimizing the throughput of the short range wireless network based on the respective time parameters. These time parameters are determined based on a non-persistent Carrier Sense Multiple Access CSMA mechanism. Therefore, the present invention employs a non-persistent CSMA mechanism to analyze the CAP of a short range wireless network and thus simplifies complexity in determining the network throughput and the analysis process of network optimization. As such, accurate throughput parameters of the standard network of the short range wireless network may be obtained, the network performance may be optimized and the performance of the short range wireless network is improved.

13 Claims, 4 Drawing Sheets

(56) References Cited

U.S. PATENT DOCUMENTS

| | | | | |
|---|---|---|---|---|
| 2002/0160769 | A1* | 10/2002 | Gray | 455/423 |
| 2004/0028072 | A1* | 2/2004 | Moutarlier | 370/448 |
| 2004/0116112 | A1* | 6/2004 | Gray | 455/423 |
| 2004/0196860 | A1 | 10/2004 | Gao et al. | |
| 2005/0008067 | A1* | 1/2005 | Lewis | 375/219 |
| 2005/0122968 | A1* | 6/2005 | Raza et al. | 370/386 |
| 2006/0040673 | A1* | 2/2006 | Bhatkata et al. | 455/452.2 |
| 2006/0109787 | A1* | 5/2006 | Strutt et al. | 370/235 |
| 2006/0245447 | A1* | 11/2006 | Chou et al. | 370/445 |
| 2006/0285504 | A1* | 12/2006 | Dong et al. | 370/254 |
| 2008/0013564 | A1* | 1/2008 | Koski | 370/445 |
| 2009/0106064 | A1* | 4/2009 | Egner et al. | 705/7 |
| 2009/0238163 | A1* | 9/2009 | Zhang et al. | 370/338 |
| 2011/0140851 | A1* | 6/2011 | Lee et al. | 340/9.1 |

OTHER PUBLICATIONS $2^{nd}$ Office Action in related U.S. Appl. No. 12/412,670 (Nov. 18, 2011).

Written Opinion of the International Searching Authority in corresponding PCT Application No. PCT/CN2007/070861 (Jan. 17, 2008).

International Search Report in corresponding PCT Application No. PCT/CN2007/070861 (Jan. 17, 2008).

"802.11g—Part 11: Wireless LAN Medium Access Control (MAC) and Physical Layer (PHY) specifications, Amendment 4: Further Higher Data Rate Extension in the 2.4 GHz Band," IEEE Standard for Information technology—Telecommunications and information exchange between systems—Local and metropolitan area networks—Specific Requirements, Jun. 27, 2003, Institute of Electrical and Electronic Engineers, Inc., New York, New York.

"802.15.4—Part 15.4: Wireless Medium Access Control (MAC) and Physical Layer (PHY) Specifications for Low-Rate Wireless Personal Area Networks (LR-WPANs)," IEEE Standard for Information Technology—Telecommunications and information exchange between systems—Local and metropolitan area networks—Specific Requirements, Oct. 1, 2003, Institute of Electrical and Electronic Engineers, Inc., New York, New York.

Bianchi, "Performance Analysis of the IEEE 802.11 Distributed Coordination Function," IEEE Journal on Selected Areas in Communications, Mar. 2000, vol. 18, No. 3, Institute of Electrical and Electronic Engineers, Inc., New York, New York.

Cali et al., "Dynamic Tuning of the IEEE 802.11 Protocol to Achieve a Theoretical Throughput Limit," IEEE/ACM Transactions on Networking, Dec. 2000, vol. 8, No. 6, Institute of Electrical and Electronic Engineers, Inc., New York, New York.

Park et al., "Throughput and energy consumption analysis of IEEE 802.15.4 slotted CSMA/CA," Electronics Letters, Sep. 1, 2005, vol. 41, No. 18, Institute of Electrical and Electronic Engineers, Inc., New York, New York.

Mišić et al., "Performance of IEEE 802.15.4 beacon enabled PAN with uplink transmissions in non-saturation mode—access delay for finite buffers," Proceedings of the First International Conference on Broadband Networks, 2004, IEEE, New York, New York.

* cited by examiner

METHOD AND SYSTEM FOR DETERMINING AND OPTIMIZING THROUGHPUT OF SHORT RANGE WIRELESS NETWORK

CROSS-REFERENCE TO RELATED APPLICATIONS

This application is a divisional application of U.S. patent application Ser. No. 12/412,670, filed on Mar. 27, 2009, which is a continuation of International Patent Application No. PCT/CN2007/070861, filed on Oct. 9, 2007. The International Application claims priority to Chinese Patent Application No. 200610140222.9, filed on Oct. 9, 2006, both of which are hereby incorporated by reference in their entirety.

FIELD OF THE INVENTION

The present invention relates to communication field, and more specifically, to methods and systems for determining and optimizing a throughput of a short range wireless network.

BACKGROUND

Currently, IEEE802.15.4 standard develops a Media Access Control (MAC) layer protocol, which provides communication solutions for short range wireless networks including wireless communication networks such as wireless personal area network (WPAN) and wireless sensor network (WSN), etc. The transmission range specified by the MAC layer protocol is about 10 meters which is a typical WPAN range.

The main features of WPAN are low rate, low power consumption, low complexity and having numerous wireless nodes. WPAN has potential applications in the field of sensors, remote control toys, smart badges, remote controllers and family automations, etc. The solution provided by the IEEE802.15.4 has both low power consumption and low complexity. Therefore, battery life may last several months or even several years.

IEEE802.15.4 utilizes a Carrier Sense Multiple Access with Collision Avoidance (CSMA/CA) media access mechanism in a Contention Access Period (CAP). Currently, in a network with slotted CSMA/CA mechanism, a coordinator may send a beacon to all sensing devices. For a device requiring data transmission, it may send a request to the coordinator for data transmission. Since only one device can transfer data at one time, all the devices which intend to transfer data may contend for the usage of transmission media with a slotted CSMA/CA algorithm.

The contention for the usage of transmission media includes the following process. All the devices which intend to transfer data need to monitor if the current wireless transmission media is being used by other device. If a current wireless transmission media is being used by other device, the device may generate a random backoff period to wait for a next channel sensing. If the current wireless transmission media is idle, the device may start to transfer data. Such process is called a non-persistent CSMA mechanism.

The coordinator needs to send an acknowledgement frame to the device after receiving a data frame from the device. If the device has not received the acknowledgement frame within a timeout period (the maximum period for the device to wait for the acknowledgement) after the device completed the transmission of the data frame, it means that the transmission fails.

To evaluate the CSMA/CA performance of networks with contention access mechanism, such as WPAN or WSN, a throughput of the network must be determined. In this way, network access can be optimized in a network according to a corresponding requirement for network performance so as to enhance the probability of a successful network access, ameliorate the network performance, and thus optimize the network throughput and achieve a desired network throughput.

Currently, in a short range wireless network such as WPAN or WSN, the network throughput is computed in accordance with CSMA/CA mechanism in IEEE802.11 standard. Specifically, a Markov model can be employed to compute a conditional probability of data transmission given a backoff state of a device. Thus, a derivation formula of the network throughput can be obtained.

However, in the implementation of invention, the inventor discovers that the mechanism of the short range wireless network such as WPAN or WSN is different from CSMA/CA mechanism of IEEE802.11. Specifically, the differences are listed below.

(1) The short range wireless network such as WPAN or WSN does not employ virtual carrier-sense mechanism so as to reduce power consumption of network devices.

(2) Request-to-send (RTS)/clear-to-send (CTS) is not employed in short range wireless network. The reason is that a single node in the short range wireless network has a low transmission rate and the data packet in transmission is not large. The loss due to the contention has less impact than does the loss due to the contention in terms of the IEEE802.11. Therefore, there is no need to arrange RTS/CTS.

(3) IEEE802.11 employs a slotted CSMA/CA, while the short range wireless network such as WPAN or WSN may employ two mechanisms, slotted and unslotted CSMA/CA. The slotted CSMA/CA frame is arranged with a dedicated contention slot while the unslotted CSMA/CA mechanism is not arranged with a contention slot.

Furthermore, the inventor discovers that if the short range wireless network such as WPAN or WSN employs CSMA/CA mechanism of IEEE802.11, it obviously does not take into consideration the intrinsic characteristics of CSMA/CA in the short range wireless network such as WPAN or WSN. Therefore, the computed network throughput may see relatively a large error, which might not be able to reflect truthfully the CSMA/CA performance in the short range wireless network such as WPAN or WSN. This might further causes inability to optimize the network access based on an accurate network throughput, which may decrease the probability of successful network access and at the same time overly increase the power consumption of the network device. Moreover, the computation process for a successful clear channel assessment (CCA) probability and a throughput is cumbersome.

SUMMARY

Methods and systems for determining and optimizing a throughput of a short range wireless network are provided according to various embodiment of the present invention. Throughput parameters of the short range wireless network such as WPAN or WSN can be obtained with accuracy. As such, the network performance can be optimized and thus the access performance of the short range wireless network is improved effectively and the power consumption of the device is declined.

A method for determining a throughput of a short range wireless network is provided according to one embodiment of the present invention. The method includes:

acquiring respective time parameters in a contention access period based on information transmission characteristics of the short range wireless network, wherein the parameters are determined based on a non-persistent Carrier Sense Multiple Access CSMA mechanism; and determining the throughput of the short range wireless network based on the respective time parameters in the contention access period.

A system for determining a throughput of a short range wireless network is further provided according to one embodiment of the present invention. The system includes a time parameter acquisition unit and a unit for determining network throughput.

The time parameter acquisition unit is configured to acquire respective time parameters in a contention access period based on information transmission characteristics of the short range wireless network, wherein the parameters are determined based on a non-persistent CSMA mechanism.

The unit for determining network throughput is configured to utilize respective time parameters in the contention access period to determine the throughput of the short range wireless network.

A method for optimizing a throughput of a short range wireless network is provided according to one embodiment of the present invention. The method includes:

acquiring respective time parameters in a contention access period based on information transmission characteristics of the short range wireless network, wherein the parameters are determined based on a non-persistent Carrier Sense Multiple Access CSMA mechanism; and determining a probability of a successful clear channel assessment CCA for the network based on the respective time parameters of the contention access period and determining the number of network devices in the network based on the probability of a successful CCA;

optimizing distribution of network access based on the number of network devices so as to optimize the network throughput.

A system for optimizing a throughput of a short range wireless network is further provided according to one embodiment of the present invention. The system includes a time parameter acquisition unit, a unit for determining the number of network devices and a network optimizing unit.

The time parameter acquisition unit is configured to acquire respective time parameters in contention access period based on information transmission characteristics of the short range wireless network, wherein the parameters are determined based on a non-persistent Carrier Sense Multiple Access CSMA mechanism.

The unit for determining the number of network devices is configured to determine the probability of a successful clear channel assessment CCA for the network based on the respective time parameters in the contention access period and determine the number of network devices in the network based on the probability of a successful CCA.

The network optimizing unit is configured to optimize the network based on the number of network devices so as to optimize the network throughput.

Advantageously, as can be seen from the foregoing solutions according to embodiments of the present invention, the method for optimizing network employs a non-persistent CSMA to analyze CAP of the short range wireless network such as WPAN or WSN. Accordingly, the complexity in the analysis process of optimization is simplified and accurate throughput parameters of the short range wireless network such as WPAN or WSN can be obtained. Therefore, the network performance is optimized effectively and the access performance of the short range wireless network is improved significantly and thereby the power consumption of the device is reduced.

DETAILED DESCRIPTION

Figure 1:
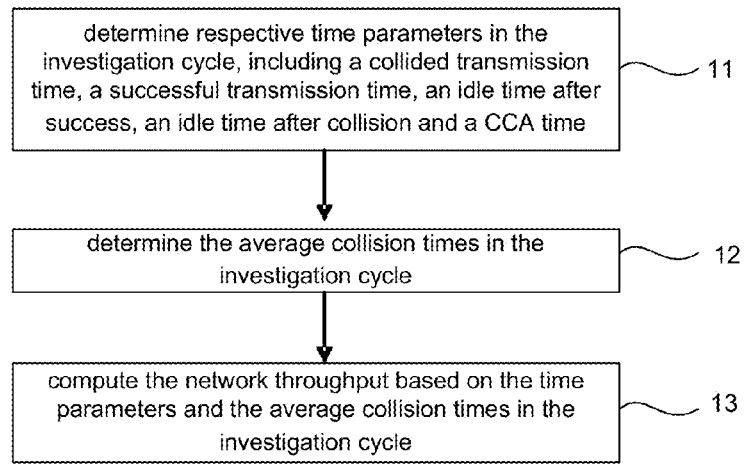
FIG. 1 is a flowchart of determining a network throughput according to one embodiment of the present invention.

A related CAP channel model is established based on information transmission characteristic of a short range wireless network such as WPAN or WSN with non-persistent CSMA mechanism according to one embodiment of the present invention. As such, a corresponding network throughput can be determined based on the channel model and the network throughput can be optimized. Specifically, network throughput can be computed by virtue of a concept of investigation cycle determined by the channel model.

According to the processing procedure of short range wireless network CSMA/CA such as WPAN or WSN, a device may sense the channel at any time. If the channel is idle, the device may transmit data; otherwise, the device may continue to sense the channel after a delay due to a backoff algorithm. The foregoing algorithm is continued when sensing the channel for a second time. Therefore, the embodiments of the present invention may employ the non-persistent CSMA mechanism to analyze the short range wireless network CSMA/CA such as WPAN or WSN so as to determine corresponding throughput parameters.

In order to investigate the state and performance of the network at a certain moment, assume that the channel is an ideal channel without invisible terminals. The number of devices is constant and each device keeps sending data with the same length to the coordinator. Moreover, the practical operating environment essentially satisfies such assumption. That is, the data traffic is small and is relatively constant. The probability for a significant change in channel condition is small. As for the number of devices, if the number varies, the network state and performance may enter a new state after going through a fluctuation period. Therefore, one might also assume the investigation cycle to be constant.

Based on the above assumption, the network throughput is defined as S, which refers to the proportion of the time of successful transmission of payload. The interval between two successful transmissions is an investigation cycle.

Implementation of accurately estimating the throughput of a short range wireless network such as WPAN or WSN is provided according to one embodiment of the present invention. The implementation includes the followings. Firstly, respective time parameters relating to contention access period (CAP) are acquired based on the information transmission characteristics of the short range wireless network. The parameters are determined based on non-persistent CSMA mechanism. Then, the throughput of the short range wireless network can be determined based on the respective time parameters relating to the contention access period. Specifically, the implementation of determining the throughput of the short range wireless network includes determining the duration of the investigation cycle for the network based on the respective time parameters relating to the contention access period, and defining the proportion of the length of payload to the duration of the investigation cycle as the throughput of the short range wireless network.

An implementation of optimizing throughput of the short range wireless network is further provided according to one embodiment of the present invention. The implementation includes the followings. Firstly, respective time parameters relating to contention access period are acquired based on the information transmission characteristics of the short range wireless network. The parameters are determined based on non-persistent CSMA mechanism. Then, the probability of a successful clear channel assessment (CCA) the network is determined based on the respective time parameters and thus the number of network devices in the network is determined based on the channel idle estimation successful probability. Lastly, the network access distribution is optimized based on the number of network devices and the network throughput rage is optimized.

In the foregoing two implementations, the information transmission characteristics includes, but not limited to a) data rate transmitted by a single node is small and the transmitted data packet is not large; b) the number of devices supported by the network is large; c) CSMA/CA mechanism is employed which features in non-persistent CSMA mechanism and supports both slotted and unslotted mechanisms.

Respective time parameters determined based on the non-persistent CSMA mechanism can be one of the followings:

(1) a clear channel assessment (CCA) time, a collided transmission time, a successful transmission time, and idle time.

(2) a clear channel assessment (CCA) time, a collided transmission time, a successful transmission time, an idle time after transmission collision and an idle time after transmission collision.

(3) a collided transmission time, a successful transmission time, and an idle time including the CCA time.

Apart from the above three situations, combination of other selected time parameters can be served as the respective time parameters relating to the channel model of the short range wireless network.

The algorithm of estimating network throughput according to one embodiment of the present invention further proposes a Markov model for a device to sense channel probability. The sensing channel probabilities (such as the probability of a successful CCA, the conditional probability of a first CCA given a backoff state, etc.) and estimation result of the probability of two consecutive successful CCAs can be determined based on the model. Meanwhile, the impact of the timeout (the maximum time period for the device to wait for the acknowledgement) on the throughput should be taken into consideration and the analysis approach for determining average idle time between communications and average collision times between successful communications should also be taken into consideration. As such, based on the determined corresponding parameters, the network throughput for the CAP channel model relating to the short range wireless network such as WPAN or WSN based on non-persistent CSMA can be computed. Thus, network performance can be quantized for assessment. The quantized result serves as a basis for determining if the network optimization has achieved an expected goal. In this way, the network throughput can be optimized.

Various embodiments of the present invention will become more readily appreciated by reference to the following description of the embodiments, when taken in conjunction with the accompanying drawings.

A method for determining network throughput in a short range wireless network is provided according to one embodiment of the present invention as illustrated in FIG. 1. The method includes the following steps.

Step 11: Respective time parameters in the investigation cycle are determined.

Figure 2:
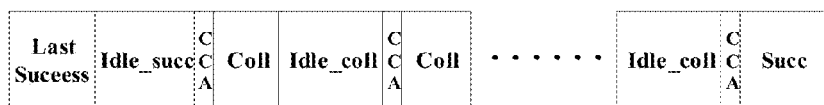
FIG. 2 is a diagram of a first channel model according to one embodiment of the present invention.

As shown in FIG. 2, each investigation cycle may include a collided transmission time coll, a successful transmission time Succ, an idle time after success Idle_succ, an idle time after collision Idle_coll and a CCA time. The CCA time is not counted in the idle time.

Figure 8:
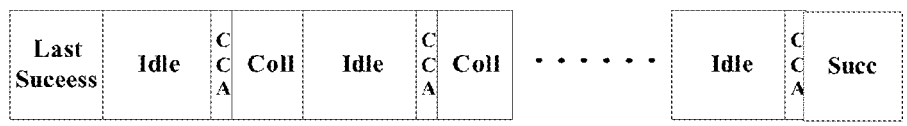
FIG. 8 is a diagram of a second channel model according to one embodiment of the present invention.

Alternatively, the specific time parameters in each investigation cycle as illustrated in FIG. 8 includes a collided transmission time coll, a successful transmission time Succ, an idle time Idle and a CCA time. The idle time may not be divided into idle time after success Idle_succ and idle time after collision Idle_coll.

The channel model shown in FIG. 2 illustrates an example of the subsequent procedure for determining the network throughput. The principle involved in its implementation also applies to the channel model shown in FIG. 8.

Step 12: The average collision times in the investigation cycle is determined.

Because the calculation of throughput S requires the time parameters in step 11 and average collision times in the investigation cycle, the average collision times $N_c$ in the investigation cycle needs to be calculated in this step.

Step 13: The network throughput is computed based on the time parameters and the average collision times in the investigation cycle.

The relationship between the network throughput S and respective time parameters in the investigation cycle may be expressed as $$S = \frac{t_p}{t_v} \quad (1)$$

$$t_v = N_c \cdot T_{idle\_coll} + T_{idle\_succ} + (N_c+1) \cdot 2 \cdot T_{CCA} + N_c T_{coll} + T_s \quad (2)$$

where $t_p$ is a payload length;

$t_v$ is average duration of the investigation cycles;

$T_{idle\_coll}$ and $T_{idle\_succ}$ are average idle time after transmission collision and average idle time after successful transmission, respectively;

$N_c$ is an average collision times in one investigation cycle; $T_{coll}$ and $T_s$ are network time occupied by collided communication (i.e., collided transmission time) and network time occupied by successful communication (i.e., successful transmission time);

$T_{CCA}$ is network time occupied by CCA (i.e., CCA time).

Calculation of the parameters other than $T_{idle\_coll}$ (which will be described later) are described below.

$$N_c = \frac{P_{coll}}{P_{succ}} \tag{3}$$

$$T_{idle\_succ} = \frac{(1-\tau)^n}{1-(1-\tau)^n} \tag{4}$$

$$T_s = T_{packet} + T_{ack} + T_{wait} = L + 3T_{coll} = LT_{CCA} = 1 \tag{5}$$

where, $P_{coll}$ and $P_{succ}$ are probabilities of collision and success of the current communication given the existence of communications in the network. n is the number of network devices, i.e., the number of devices in the star type network. $\tau$ is a conditional probability of a first CCA given that the device is in a backoff state. $T_{packet}$ is a packaging time. $T_{ack}$ is a time for making acknowledgement. $T_{wait}$ is a waiting time.

In order to determine the network throughput S, each parameter mentioned in the above equations needs to be obtained. The computation of these parameters will be described below respectively.

(1) A method for calculating the conditional probability $\tau$ of a first CCA given a backoff state is illustrated below.

Figure 3:
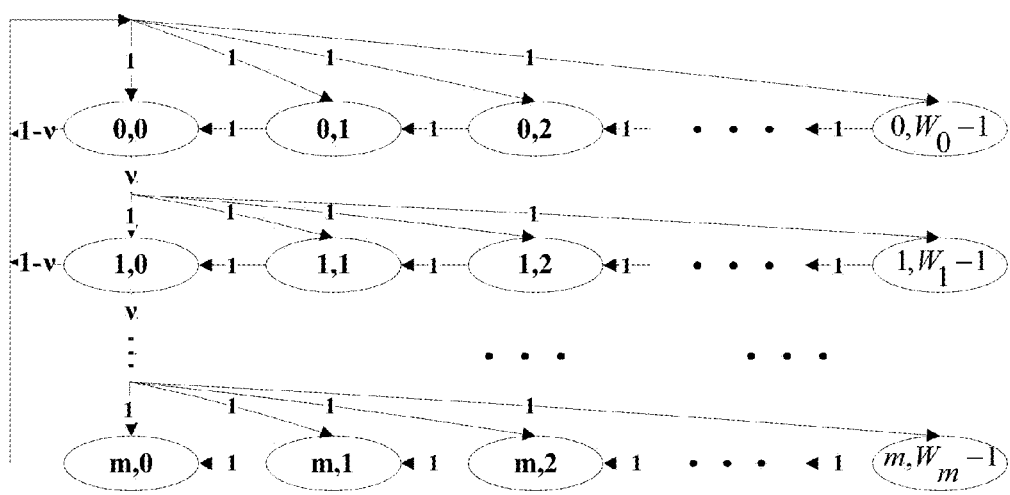
FIG. 3 is a Markov model for device CCA adopted in one embodiment of the present invention.

A two dimensional Markov model illustrated in FIG. 3 can be used to analyze the conditional probability of the first CCA $\tau$ at any time during backoff is analyzed. In this model, a second CCA state is omitted. $\tau$ is given by $$\tau = \frac{\sum_{i=0}^{m}(i,0)}{\sum_{i=0}^{m}\sum_{j=0}^{W_i}(i,j)} = \frac{\frac{1-v^{m+1}}{1-v}}{\frac{1}{2}\sum_{i=0}^{m}(W_0 2^{\min(i,2)}+1)v^i} \tag{6}$$

In equation (6) and FIG. 3, Wi denotes the maximum backoff counter value currently. m denotes the current backoff times. 1−v denotes the probability of two consecutive successful CCAs. (i, j) denotes backoff state. When the backoff counter j is 0, the device performs a first CCA.

Based on the channel model illustrated in FIG. 2, the probability of two consecutive successful CCAs 1−v may be expressed as $$1-v = \frac{T_{vi2}}{T_{v2}} = \frac{N_c(T_{idle\_coll} + 2T_{CCA} - 1) + T_{idle\_succ} + 2T_{CCA} - 1}{t_v - 1} \tag{7}$$

In equation (7), $T_{vi2}$ denotes the average number of two consecutive idle slots in an investigation cycle. $T_{v2}$ denotes the number of two consecutive slots in an investigation cycle.

(2) Calculate an average collision times in an investigation cycle.

Since the success or failure of a last communication has a direct impact on the probability of success of the current communication. Therefore, the average collision times Nc in an investigation cycle may be solved using the Markov model shown in FIG. 4.

$P_{coll}$ and $P_{succ}$ denote the probabilities of collision and success of the current communication, respectively.

$$P_{succ} = \frac{1 - P_{c\_c}}{1 - P_{c\_c} + P_{c\_s}} \tag{8}$$

$$P_{coll} = 1 - P_{succ}$$

In equation (8), $$P_{c\_s} = \frac{1 - (1-\tau)^n - n\tau(1-\tau)^{n-1}}{1 - (1-\tau)^n},$$

Figure 4:
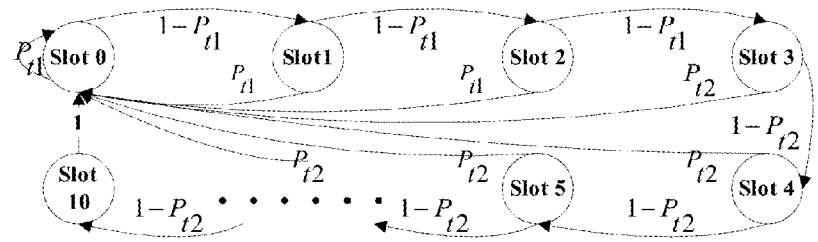
FIG. 4 is diagram of a Markov model for average idle time after collision according to one embodiment of the present invention.

$P_{s\_s} = 1 - P_{c\_s}$, $P_{s\_c} = 1 - P_{c\_c}$. In FIG. 4 and equation (8), $P_{c\_s}$ and $P_{s\_s}$ denote the probabilities of collision and success of the current communication respectively given that the last communication is successful. $P_{s\_c}$ denotes the probability of success of the current communication after the collision of the last communication. $P_{c\_c}$ denotes the probability of collision of the current communication after the collision of the last communication. The calculation of the probabilities will be described later.

Therefore, the average collision times Nc is expressed as $$N_c = \frac{P_{c\_s}}{1 - P_{c\_c}} \tag{9}$$

The average collision times in the investigation cycle can be calculated based on the above equation.

(3) An idle time after communication collision $T_{idle\_coll}$ and $P_{c\_c}$ are further required in order to calculate the average collision times in the investigation cycle and network throughput. The calculation is described below.

Currently, in IEEE802.15.4 standard, the timeout period includes 2.7 slots, which is longer than the time required for CCA (2 slots). Therefore, the device which is not involved in the last communication collision might contend in the timeout duration for the chance to sense and access the channel. On the contrary, the device which is involved in the last communication collision must be in a state of waiting for acknowledgement in this period. For these reasons, the idle time after collision may be divided into two contention periods: timeout period (i.e., period relating to timeout) and other idle period (i.e., periods other than timeout period in the idle time).

Figure 5:
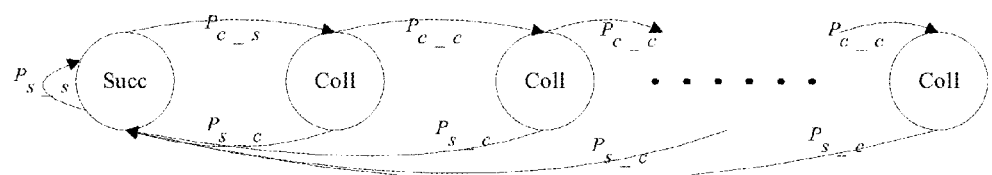
FIG. 5 is a diagram of a Markov model for average collision times in successful communications according to one embodiment of the present invention.

The Markov model can be used to study the idle time model after collision. As illustrated in FIG. 5, slot i denotes the number of idle slots in the network after collision and before the device starts a first CCA. $P_{t1}$ denotes the probability that there exists a device for a first CCA during timeout period. $P_{t2}$ denotes the probability that there exists a device for a first CCA during other idle period. Since the device involved in the collision may back off at most 7 slots to sense the channel, the maximum i equals 10. Xi denotes the probability of slot i.

$$X_0 = \frac{1}{\frac{1-(1-P_{t1})^4}{P_{t1}} + (1-P_{t1})^3 \cdot \frac{(1-P_{t2})-(1-P_{t2})^8}{P_{t2}}} \tag{10}$$

-continued $$X_i = X_0 \cdot (1 - P_{t1})^i \qquad 1 \le i \le 3$$
$$X_i = X_0 \cdot (1 - P_{t1})^3 \cdot (1 - P_{t2})^{i-3} \qquad 4 \le i \le 10$$

$P_{t1}$ and $P_{t2}$ in equation (10) can be derived from $$P_{t1} = 1 - (1-\tau)^{n-n_0} \quad P_{t2} = 1 - (1-\tau)^n \tag{11}$$

In equation (11), $n_0$ denotes the average number of devices involved in the collision. With the above model, $T_{idle\_coll}$ and the probability of collision of the current communication after the collision of the last communication $P_{c\_c}$ can be derived.

$$T_{idle\_coll} = \sum_{i=0}^{10} i \cdot X_i \tag{12}$$

$$P_{c\_c} = \sum_{i=0}^{2} P_{c\_timeout} \cdot X_i + \sum_{i=3}^{10} P_{c\_untimeout} \cdot X_i \tag{13}$$

In equation (13), $P_{c\_timeout}$ and $P_{c\_untimeout}$ are probabilities of collision during timeout period and during other idle period, respectively.

$$p_{c\_timeout} = \frac{1 - (1-\tau)^{n-n_0} - n\tau(1-\tau)^{n-n_0-1}}{1 - (1-\tau)^{n-n_0}} \tag{14}$$

$$p_{c\_untimeout} = \frac{1 - (1-\tau)^n - n\tau(1-\tau)^{n-1}}{1 - (1-\tau)^n} \tag{15}$$

(4) Determine the average number of devices involved in the collision although the number of devices involved in contention for CCA is not constant due to the timeout period, all the devices are still assumed to be involved in the contention at any idle time. The average number of devices involved in the contention can be obtained from $$n_0 = \sum_{i=2}^{\infty} i \cdot Coll_i = \sum_{i=2}^{\infty} i \cdot \frac{C_n^i \tau^i (1-\tau)^{n-i}}{1 - (1-\tau)^n - n\tau(1-\tau)^{n-1}} \tag{16}$$

In equation (16), $Coll_i$ is the probability that i devices are involved in the collision.

So far, all the parameters required for computing the network throughput S can be obtained. Therefore, the related throughput S can be determined. Moreover, in the computational process, since the specific characteristics of the short range communication network are fully considered, the determined throughput S may reflect the real performance of the network in accuracy. Moreover, the whole computational process of the throughput S is much simpler.

In the above implementation, each parameter is computed adopting the foregoing equations (1) to (16). In the process of implementing the embodiments of the present invention, the computation of the parameters may not be limited to the above equations. Any insubstantial variation within the spirit of the concept of determining the network throughput shall be construed as fall within the scope of the present invention.

Figure 6:
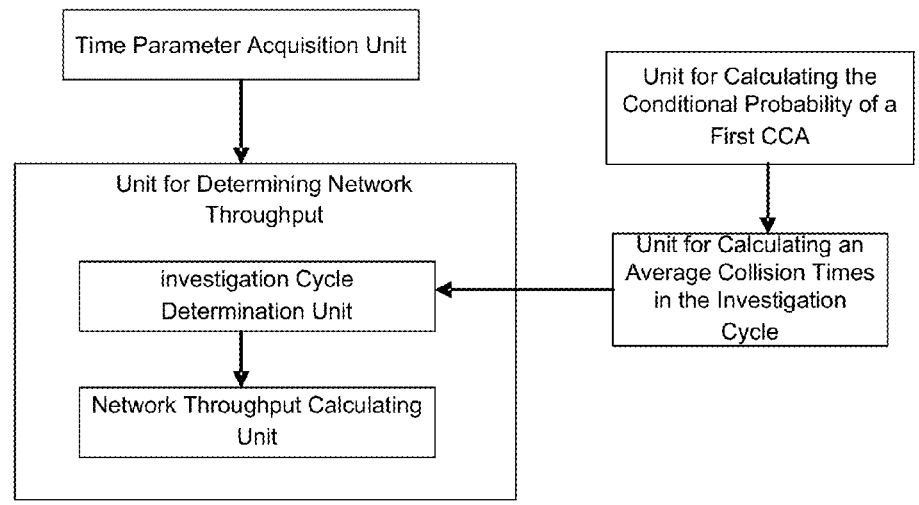
FIG. 6 is a system diagram of determining a network throughput according to one embodiment of the present invention.

A system for determining a throughput of a short range wireless network is further provided according to one embodiment of the present invention. The structure of the system is illustrated in FIG. 6, which includes a time parameter acquisition unit and a unit for determining network throughput.

(1) The time parameter acquisition unit is configured to acquire respective time parameters in CAP based on the information transmission characteristics of the short range wireless network. These parameters are determined based on a non-persistent CSMA mechanism.

The respective time parameters may be a CCA time, a collided transmission time, a successful transmission time, and an idle time. Alternatively, the respective time parameters may be a CCA time, a collided transmission time, a successful transmission time, an idle time after transmission collision, and an idle time after successful transmission. Alternatively, the respective time parameters may be a collided transmission time and a successful transmission time and an idle time including the CCA time. Of course, apart from the foregoing, combination of other selected time parameters can be served as respective time parameters relating to the channel model of the short range wireless network.

(2) The unit for determining network throughput is configured to determine the duration of investigation cycle in the network based on the respective time parameters in the contention access period; and determine the throughput of the short range wireless network based on the length of the payload and the duration of the investigation cycle. The unit for determining network throughput includes an investigation cycle determination unit and a network throughput calculating unit.

The investigation cycle determination unit is configured to determine the duration of an investigation cycle based on the average collision times in the investigation cycle and the respective time parameters.

The network throughput calculating unit is configured to calculate the proportion of the length of payload to the investigation cycle and define the proportion as the network throughput.

(3) A unit for calculating an average collision times in the investigation cycle is configured to provide an average collision times in the investigation cycle for the investigation cycle determination unit.

Specifically, this unit calculates the probability of collision of the current communication after the success of the last communication and the probability of the collision of the current communication after the collision of the last communication. The average collision times may be determined based on the two calculated probabilities.

The conditional probability of a first CCA is provided by a unit for calculating the conditional probability of a first CCA. Specifically, the unit determines a probability of two consecutive successful CCAs based on the average number of two consecutive idle slots and the number of two consecutive slots. The unit further determines the conditional probability of a first CCA based on the probability of two consecutive successful CCAs.

In the system, the way to calculate each parameter is illustrated in the description of the calculation of the network throughput, which is omitted herein for brevity.

In conclusion, embodiments of the present invention employ a non-persistent CSMA mechanism to analyze CAP of the short range wireless network such as WPAN or WSN. As a result, the analysis process is simplified. Also, the embodiments of the present invention propose a method for estimating CCA probability and successful CCA probability of a device based on channel model. As such, the CCA estimation method is more reasonable and is significantly simplified. In addition, embodiments of the present invention further take into consideration the impact of timeout period on the throughput performance and propose an analysis method based on timeout period and thus correct the estimations of the throughput. Consequently, the estimation result is more accurate.

In one embodiment of the present invention, an implementation for optimizing network is further provided based on the foregoing equations for calculating network throughput.

The solution mainly includes the followings. First, the actual number of network devices included in the current network is calculated based on a CAP channel model. Subsequently, a backoff window which enables the current network to obtain the optimal network throughput is determined. Then, the backoff window is used to optimize the access contention process of the network device.

Figure 7:
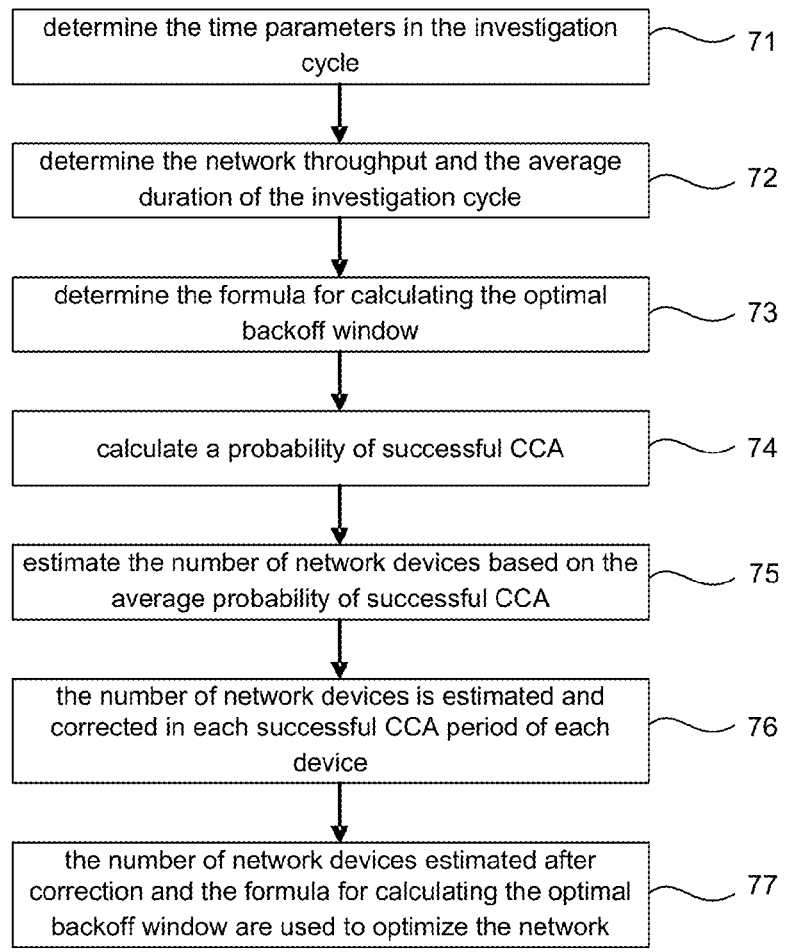
FIG. 7 is a flowchart of network optimization according to one embodiment of the present invention.

FIG. 7 illustrate a fully distributed method for access contention according to one embodiment of the present invention, i.e., a related implementation of a network optimization method. The method includes the following steps.

Step 71: the time parameters in the investigation cycle are determined.

According to the channel mode for contention access period according to one embodiment of the present invention as illustrated in FIG. 8, each investigation cycle includes a collided transmission time, a successful transmission time, an idle time (including idle time after success and idle time after collision) and a CCA time. Specifically, CCA time is not counted in the idle time.

Step 72: The network throughput S and the average duration of the investigation cycle are determined.

$$S = \frac{t_p}{t_v} \qquad (17)$$

$$t_v = (N_c+1) \cdot (2 \cdot T_{CCA} + T_{idle}) + N_c T_{coll} + T_s \qquad (18)$$

where $t_p$ denotes the length of payload. $t_v$ denotes the average time length of the investigation cycle. $T_{idle}$ denotes idle time, i.e., the average idle time between communications. $N_c$ denotes an average collision times in one investigation cycle. $T_{coll}$ and $T_s$ are network time occupied by collided communication and successful communication respectively. $T_{CCA}$ is CCA time, i.e., the network time occupied by the CCA.

Each parameter in equation (17) and (18) is calculated as follows.

$$N_c = \frac{P_{coll}}{P_{succ}} \qquad (19)$$

$$T_{idle} = \frac{(1-\tau)^n}{1-(1-\tau)^n} \qquad (20)$$

$$T_s = T_{packet} + T_{ack} + T_{wait} = L + 3T_{coll} = LT_{CCA} = 1 \qquad (21)$$

In the equations, $P_{coll}$ and $P_{succ}$ denote the probability of collision and the probability of success of the communication given the existence of communication in the network. n denotes the number of devices in a star type network. τ denotes the conditional probability of a first CCA given that the device is in a backoff state.

Step 73: The condition which enables the network throughput to approximate theoretical limit is proposed based on channel model.

By reference to the optimization method of the persistent CSMA and the characteristics of non-persistent CSMA as well as the method for calculating network throughput, it is understood that the network throughput may approximate theoretical limit provided that the following equation is satisfied.

$$(1+N_c)T_{idle} = N_c \cdot T_{coll} \qquad (22)$$

After mathematical transformation and simplification are performed upon equation (22), the optimal sensing channel probability can be obtained by, i.e., the formula for calculating conditional probability τ of a first CCA given a backoff state.

$$\tau_{opt} = \frac{-1 + \sqrt{2L-1}}{(L-1)n} \qquad (23)$$

Based on equation (23), a corresponding optimal backoff window BW is given by $$BW = \frac{2}{\tau_{opt}} - 1 = \frac{2(L-1)n}{-1 + \sqrt{2L-1}} - 1 \qquad (24)$$

As such, after the number of network devices is determined, the optimal backoff window of the current network can be determined. With the optimal backoff window, the probability of success access of the network device can be improved effectively. As such, the optimal network throughput can be obtained and the network throughput can be optimized.

The determination of the number of network devices is illustrated below.

Step 74: Probability of successful CCA is calculated.

Average probability of successful CCA can be obtained by virtue of the channel model as illustrated in FIG. 8.

$$P_{CCA} = \frac{(N_c+1)(T_{idle} + 2T_{CCA} - 1)}{t_v - 1} \qquad (25)$$

In equation (25), the numerator denotes the average number of two consecutive idle slots in an investigation cycle. The denominator denotes the number of two consecutive slots in an investigation cycle.

Step 75: The number of network devices is estimated based on the average probability of successful CCA.

Each device may estimate accurately the number of network devices with $N_{CCA}$ (CCA times between average successful CCAs concerning the device).

$$N_{CCA} = \frac{1}{P_{CCA}} = \frac{1}{(L+2) - (L+1)(1-\tau)^n + 2n\tau(1-\tau)^{n-1}} \qquad (26)$$

So far, the number of network devices can be derived from equation (26).

$$n = \frac{L+3 - \sqrt{(L+3)^2 - 8(N_{CCA} - 1)}}{4\tau} \qquad (27)$$

Step 76, the number of network devices is estimated and corrected in each successful CCA period of each device. The procedure is detailed below.

$$\text{estimated}\_n_{i+1} = w \cdot \text{estimated}\_n_i + (1-w) \cdot n_i \qquad (28)$$

In equation (28), estimated_$n_i$ denotes the estimated number of network devices for $i^{th}$ successful CCA period. $n_i$ denotes the result of the equation (27) when the $i^{th}$ successful CCA period ends. w is a smoothing factor. Since the variance of $N_{CCA}$ is large, w=0.99 is recommended.

Step 77: The number of network devices estimated from equation (28) and the backoff window derived from equation (24) are used to optimize the network.

Specifically, In each successful CCA period, $N_{CAA}$, as a feedback signal of network contention level, is used to estimate the number of network devices with equations (27-28). The backoff window is determined based on the number of network devices and equation (24). The method for access contention of the network devices may be corrected to approximate its optimum with the backoff window so that the network may be optimized and the probability of successful access of the network device may be enhanced and thus the throughput of the network may achieve its optimum.

In the computational process of each parameter, the foregoing equations (17) to (28) are adopted. In the process of implementing the embodiments of the present invention, the computation of the parameters may not be limited to equations (17) to (28). Any insubstantial variation within the spirit of the concept of optimizing the network throughput shall be construed as fall within the scope of the present invention.

Figure 9:
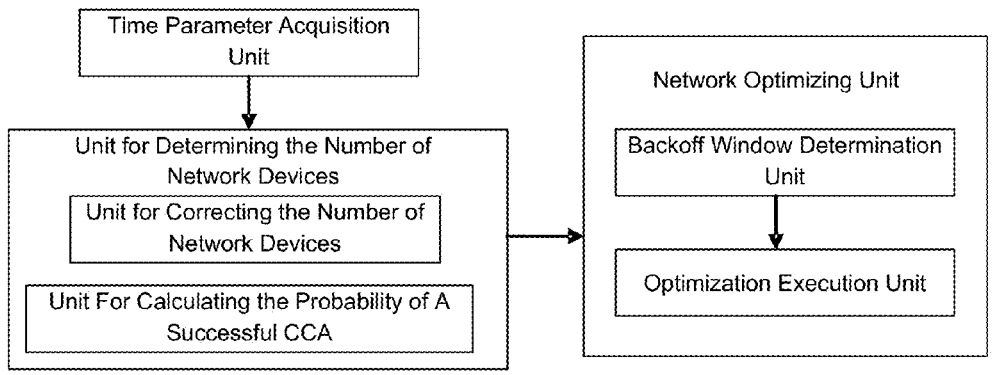
FIG. 9 is a network optimization system according to one embodiment of the present invention.

A system for optimizing a throughput of a short range wireless network is further provided according to one embodiment of the present invention. The structure of the system is illustrated in FIG. 9, which includes a time parameter acquisition unit, a unit for determining the number of network devices and a network optimizing unit.

(1) The time parameter acquisition unit is configured to acquire respective time parameters in CAP based on the information transmission characteristics of the short range wireless network. The parameters are determined based on a non-persistent CSMA mechanism.

The respective time parameters may be a CCA time, a collided transmission time, a successful transmission time, and idle time. Alternatively, respective time parameters may be a CCA time, a collided transmission time, a successful transmission time, an idle time after transmission collision, and an idle time after successful transmission. Alternatively, the respective time parameters may be a collided transmission time and a successful transmission time and an idle time including the CCA time. Of course, apart from the foregoing, combination of other selected time parameters can be served as respective time parameters relating to the channel model of the short range wireless network.

For instance, based on the channel model illustrated in FIG. 8, the corresponding time parameter includes a CCA time, a collided transmission time, a success transmission time and an idle time.

(2) The unit for determining the number of network devices is configured to determine the probability of successful CCA for the network and determine the number of network devices in the short range wireless network based on the probability of successful CCA and the time parameters.

The unit for determining the number of network devices includes a unit for correcting the number of network devices. Specifically, the unit is configured to utilize a smoothing factor to correct the number of network devices during a current successful CCA period and the number of network devices after the current successful CCA period terminates, and obtain the number of network devices for the next successful CCA period.

The number of network devices after the current successful CCA period terminates is determined by the collided transmission time and the probability of successful CCA and the conditional probability of a first CCA given the backoff state.

The unit for determining the number of network devices may further include a unit for calculating a probability of successful CCA. The unit is configured to provide a parameter of the probability of successful CCA for the unit for determining the number of network devices. Also, the unit determines the probability of successful CCA based on the average collision times in the investigation cycle and the respective time parameters.

The average collision times in the investigation cycle may be the proportion of the probability of collision of the current communication after the success of the last communication to the probability of success of the current communication after the collision of the last communication. Also, these two probabilities are all determined by the conditional probability of a first CCA given the backoff state of the device.

(2) The network optimizing unit is configured to optimize the network based on the number of network devices and thereby optimize the throughput of the short range wireless network. The unit may include:

a backoff window determination unit configured to determine the backoff window corresponding to the network throughput based on the number of network devices and time parameters in the network;

an optimization execution unit configured to optimize the network based on the backoff window. That is, the access contention mechanism (backoff mechanism) needs to be readjusted for each network device so that each device may obtain a higher probability of a successful access, thus optimizing the network throughput.

In the system, the way to calculate each parameter is illustrated in the description of the optimization of the network throughput, which is omitted herein for brevity.

As demonstrated by emulation, the method for optimizing the network according to embodiments of the present invention may enable the network throughput to reach its optimum shortly after the number of network devices varies. Two emulation instances are presented below for illustration.

Assume that, in WPAN, several devices simultaneously transmit data with fixed packet length to one coordinator. Each device may employ the foregoing complete distributed method and thus optimize the network performance.

Figure 10:
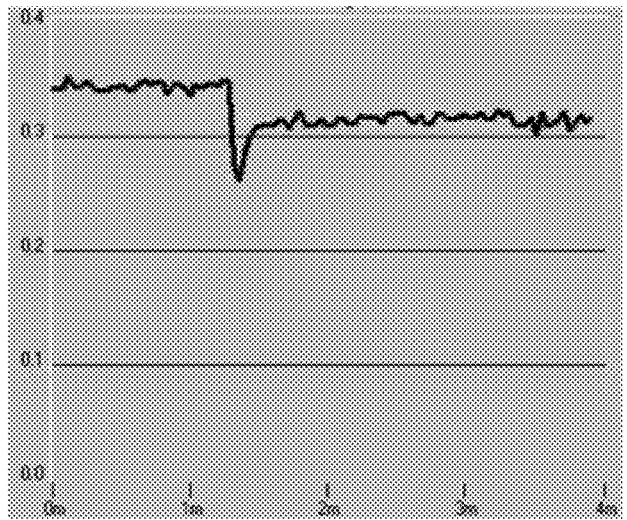
FIG. 10 is a first schematic of emulation effect after network optimization according to one embodiment of the present invention.

The emulation result of a first emulation instance is shown in FIG. 10. Initially, the number of network devices is 5. After the network has been running for 80 seconds, 15 devices connect to the network. FIG. 10 is an emulation plot of network throughput over 4 minutes. As can be seen, the network reaches stability very soon and achieves a new optimum after the network goes through a temporary fluctuation of throughput.

Figure 11:
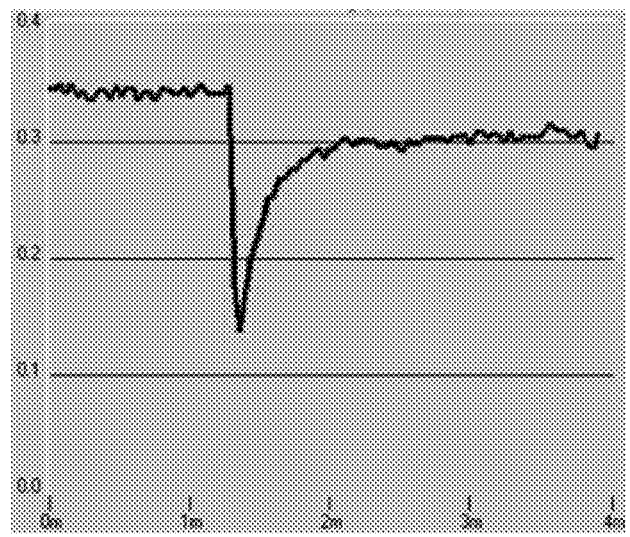
FIG. 11 is a second schematic of emulation effect after network optimization according to one embodiment of the present invention.

The emulation result of a second emulation instance is shown in FIG. 11. Initially, the number of network devices is 5. After the network has been running for 80 seconds, 35 devices connect to the network. FIG. 11 is an emulation plot of network throughput over 4 minutes. As also can be seen from the instance, the network reaches stability very soon and achieves a new optimum after the network goes through a temporary fluctuation of throughput.

Therefore, after employing the complete distributed optimizing method according to the embodiments of the present invention, even though the number of network devices changes dramatically at a certain moment, the network throughput can still maintain at a level close to the theoretical limit after a temporary period (this period is dependent on the smoothing factor). In addition, it is expected that utilization efficiency of network energy may not deteriorate sharply as the level of network contention changes.

In conclusion, the advantages of the embodiments of the present invention are presented below.

(1) The advantages of the solutions for determining the network throughput according to the embodiments of the present invention are described below.

The embodiments of the present invention employ a non-persistent CSMA to analyze CAP (Contention Access Period) of the short range wireless network such as WPAN or WSN so that the analysis procedure is simplified. Moreover, the estimation of CCA may be more reasonable and significantly simplified according to the channel model provided by embodiments of the present invention. In addition, the embodiments of the present invention further takes into consideration the impact of the timeout (the maximum time period for the device to wait for the acknowledgement) on the throughput, proposes a analysis method based on timeout period and corrects the estimations of the throughput, which makes the estimation result of the throughput more accurate. Therefore, an implementation for accurately estimating the network throughput of the short range wireless network such as WPAN or WSN is provided according to one embodiment of the present invention. The implementation provides a reliable analysis tool and method for the network performance assessment. As such, the overall performance of the network is enhanced and the user interest and service quality are guaranteed.

(2) The advantages of the solution for network optimization according to embodiments of the present invention are presented below.

The embodiments of the present invention employ a non-persistent CSMA to analyze CAP (Contention Access Period) of the short range wireless network such as WPAN or WSN so that the analysis procedure is simplified. Likewise, the probability of successful CCA is estimated with the channel model and thus the estimation of CCA may be more reasonable and significantly simplified. In addition, a simple method for each device to estimate the number of network devices without additional requirements for hardware, are provided according to one embodiment of the present invention. Further, the embodiments of the present invention enable the CSMA/CA network throughput of the short range wireless network such as WPAN or WSN to approximate the theoretical limit. Also, the utilization efficiency of the network energy may be improved while optimizing the throughput.

The foregoing are merely exemplary embodiments of the present invention, while the scope of the present invention is not so limited. Any variations or equivalents can be readily appreciated by those skilled in the art. These variations or equivalents shall be construed as fall within the scope of the present invention. Therefore, the scope of the present invention should be determined by the scope of the claims.

The foregoing teachings are merely a number of exemplary embodiments of the present invention, which shall not be used to delineate the scope of protection of the present invention. Any modification, equivalents, improvements, etc can be made within the spirit and the scope of the present invention and shall be included in the scope of protection of the present invention.

What is claimed is:

1. A method for determining a throughput of a short range wireless network, comprising:

acquiring respective time parameters in a contention access period based on information transmission characteristics of the short range wireless network, wherein the respective time parameters are determined based on a non-persistent Carrier Sense Multiple Access (CSMA) mechanism; and determining the throughput of the short range wireless network based on the respective time parameters in the contention access period;

wherein determining the throughput of the short range wireless network comprises:

determining a duration of an investigation cycle in the network based on the respective time parameters in the contention access period and average collision times in an investigation cycle, and determining the throughput of the short range wireless network based on a payload length and the duration of the investigation cycle;

wherein the average collision times are determined based on:

a probability of collision of a current transmission after a success of a last transmission, and a probability of collision of the current transmission or a success of the current transmission after a collision of the last transmission, and wherein the probability of collision of the current transmission and the success of the current transmission are both determined based on a conditional probability of a first clear channel assessment (CCA) given that a device is in a backoff state.

2. The method of claim 1, wherein the respective time parameters comprise at least one of the group consisting of:

(a) a clear channel assessment (CCA) time, a collided transmission time, a successful transmission time, and an idle time;

(b) the CCA time, the collided transmission time, the successful transmission time, an idle time after transmission collision and an idle time after successful transmission; and (c) the collided transmission time, the successful transmission time, and an idle time including the CCA time;

wherein the collided transmission time is one of the group consisting of: (a) a time period between an end of the CCA time and a beginning of the idle time after the transmission collision, and (b) a time period between the end of the CCA time and a beginning of an idle time not including the CCA time.

3. The method of claim 1, wherein the conditional probability of the first CCA is determined based on a Markov model and a probability of two consecutive successful CCAs, and the probability of the two consecutive successful CCAs is determined based on the average number of two consecutive idle slots and the number of two consecutive slots in the investigation cycle; and the probability of the collision of the current transmission after the collision of the last transmission is determined based on a probability of collision in a maximum period for the device to wait for an acknowledgement and a probability of collision in other idle period; and the probability of collision in the maximum period for the device to wait for the acknowledgement and the probability of collision in the other idle period are determined respectively based on the conditional probability of the first CCA given the backoff state.

4. A system for determining a throughput of a short range wireless network, comprising:

a time parameter acquisition unit comprising a hardware processor, configured to acquire respective time parameters in a contention access period based on information transmission characteristics of the short range wireless network, wherein the respective time parameters are determined based on a non-persistent Carrier Sense Multiple Access (CSMA) mechanism;

a unit for determining network throughput comprising a hardware processor, configured to utilize the respective time parameters in the contention access period to determine the throughput of the short range wireless network;

a unit for calculating an average collision times in the investigation cycle comprising a hardware processor, configured to determine a probability of collision of a current transmission after a success of a last transmission and a probability of collision of the current transmission after a collision of the last transmission and determine the average collision times in the investigation cycle with the said two calculated probabilities of collision of the current transmission;

wherein the unit for determining the network throughput comprises:
- an investigation cycle determination unit, configured to determine a duration of an investigation cycle based on an average collision times in the investigation cycle and the respective time parameters, and
- a network throughput calculating unit, configured to determine a proportion of a length of payload to the duration of the investigation cycle, wherein the proportion is the network throughput.

5. The system of claim 4, wherein the respective time parameters comprises at least one of the group consisting of:
(a) a clear channel assessment (CCA) time, a collided transmission time, a successful transmission time, and an idle time;
(b) the CCA time, the collided transmission time, the successful transmission time, an idle time after transmission collision and an idle time after successful transmission; and
(c) the collided transmission time, the successful transmission time, and an idle time including the CCA time;
wherein the collided transmission time is one of the group consisting of: (a) a time period between an end of the CCA time and a beginning of the idle time after the transmission collision, and (b) a time period between the end of the CCA time and a beginning of an idle time not including the CCA time.

6. The system of claim 4, further comprising:
a unit for calculating a conditional probability of a first clear channel assessment (CCA) comprising a hardware processor, configured to:
- determine a probability of two consecutive successful CCAs based on the average number of two consecutive idle slots and the number of two consecutive slots in the investigation cycle, and
- determine the conditional probability of the first CCA based on the probability of the two consecutive successful CCAs.

7. A system for optimizing a throughput of a short range wireless network, comprising:
a time parameter acquisition unit comprising a hardware processor, configured to acquire respective time parameters in a contention access period based on information transmission characteristics of the short range wireless network, wherein the respective time parameters are determined based on a non-persistent Carrier Sense Multiple Access (CSMA) mechanism;

a unit for determining the number of network devices comprising a hardware processor, configured to determine a probability of a successful clear channel assessment (CCA) for the network based on the respective time parameters in the contention access period and determine the number of network devices in the network based on the probability of the successful CCA; and a network optimizing unit comprising a hardware processor, configured to optimize the network based on the number of the network devices so as to optimize the network throughput;

wherein the unit for determining the number of the network devices comprises:
a unit for calculating the probability of the successful CCA configured to calculate the probability of the successful CCA based on average collision times in an investigation cycle and the respective time parameters, wherein the average collision times in the investigation cycle is the proportion of a probability of collision of a current transmission after a success of a last transmission to a probability of success of the current transmission after a collision of the last transmission; and these said two probabilities are both determined based on the conditional probability of a first CCA given a backoff state of the device; and a unit for calculating the number of the network devices based on the probability the successful CCA.

8. The system of claim 7, wherein the respective time parameters comprises at least one of the group consisting of:
(a) a clear channel assessment (CCA) time, a collided transmission time, a successful transmission time, and an idle time;
(b) the CCA time, the collided transmission time, the successful transmission time, an idle time after transmission collision and an idle time after successful transmission; and
(c) the collided transmission time, the successful transmission time, and an idle time including the CCA time;
wherein the collided transmission time is one of the group consisting of: (a) a time period between an end of the CCA time and a beginning of the idle time after the transmission collision, and (b) a time period between the end of the CCA time and a beginning of an idle time not including the CCA time.

9. The system of claim 7, wherein the unit for determining the number of network devices further comprises a unit for correcting the number of the network devices, wherein the unit for correcting the number of the network devices is configured to
use a smoothing factor to correct the number of the network devices in a current successful CCA period and the number of the network devices after the current successful CCA period and acquire the number of the network devices in a next successful CCA period, wherein the number of the network devices after the current successful CCA period is determined based on the collided transmission time, the probability of the successful CCA and a conditional probability of a first CCA given a backoff state.

10. The system of claim 7, wherein the network optimizing unit further comprises:
a backoff window determination unit configured to determine a backoff window corresponding to the optimal network throughput based on the number of the network devices and the time parameters in the network; and
an optimization execution unit, configured to optimize the network based on the backoff window.

11. One or more non-transitory computer readable mediums, comprising a logic encoded in the at least one computer readable medium, the logic when executed operable to implement the method comprising:

acquiring respective time parameters in a contention access period based on information transmission characteristics of the short range wireless network, wherein the respective time parameters are determined based on a non-persistent Carrier Sense Multiple Access (CSMA) mechanism; and determining the throughput of the short range wireless network based on the respective time parameters in the contention access period;

wherein determining the throughput of the short range wireless network comprises:

determining a duration of an investigation cycle in the network based on the respective time parameters in the contention access period and average collision times in an investigation cycle, and determining the throughput of the short range wireless network based on a payload and the duration of the investigation cycle;

wherein the average collision times are determined based on:

a probability of collision of a current transmission after a success of a last transmission, and a probability of collision of the current transmission or a success of the current transmission after a collision of the last transmission, and wherein the probability of collision of the current transmission and the success of the current transmission are both determined based on a conditional probability of a first clear channel assessment (CCA) given that a device is in a backoff state.

12. The one or more non-transitory computer readable mediums of claim 11, wherein the respective time parameters comprise at least one of the group consisting of:

(a) a clear channel assessment (CCA) time, a collided transmission time, a successful transmission time, and an idle time;

(b) the CCA time, the collided transmission time, the successful transmission time, an idle time after transmission collision and an idle time after successful transmission; and (c) the collided transmission time, the successful transmission time, and an idle time including the CCA time;

wherein the collided transmission time is one of the group consisting of: (a) a time period between an end of the CCA time and a beginning of the idle time after the transmission collision, and (b) a time period between the end of the CCA time and a beginning of an idle time not including the CCA time.

13. The one or more non-transitory computer readable mediums of claim 11, wherein the conditional probability of the first CCA is determined based on a Markov model and a probability of two consecutive successful CCAs, and the probability of the two consecutive successful CCAs is determined based on the average number of two consecutive idle slots and the number of two consecutive slots in the investigation cycle; and the probability of the collision of the current transmission after the collision of the last transmission is determined based on a probability of collision in a maximum period for the device to wait for an acknowledgement and a probability of collision in other idle period; and the probability of collision in the maximum period for the device to wait for the acknowledgement and the probability of collision in the other idle period are determined respectively based on the conditional probability of the first CCA given the backoff state.

* * * * *